Sept. 20, 1949.  G. H. NORQUIST  2,482,122
NOTCHING MACHINE
Filed June 23, 1945  4 Sheets-Sheet 1
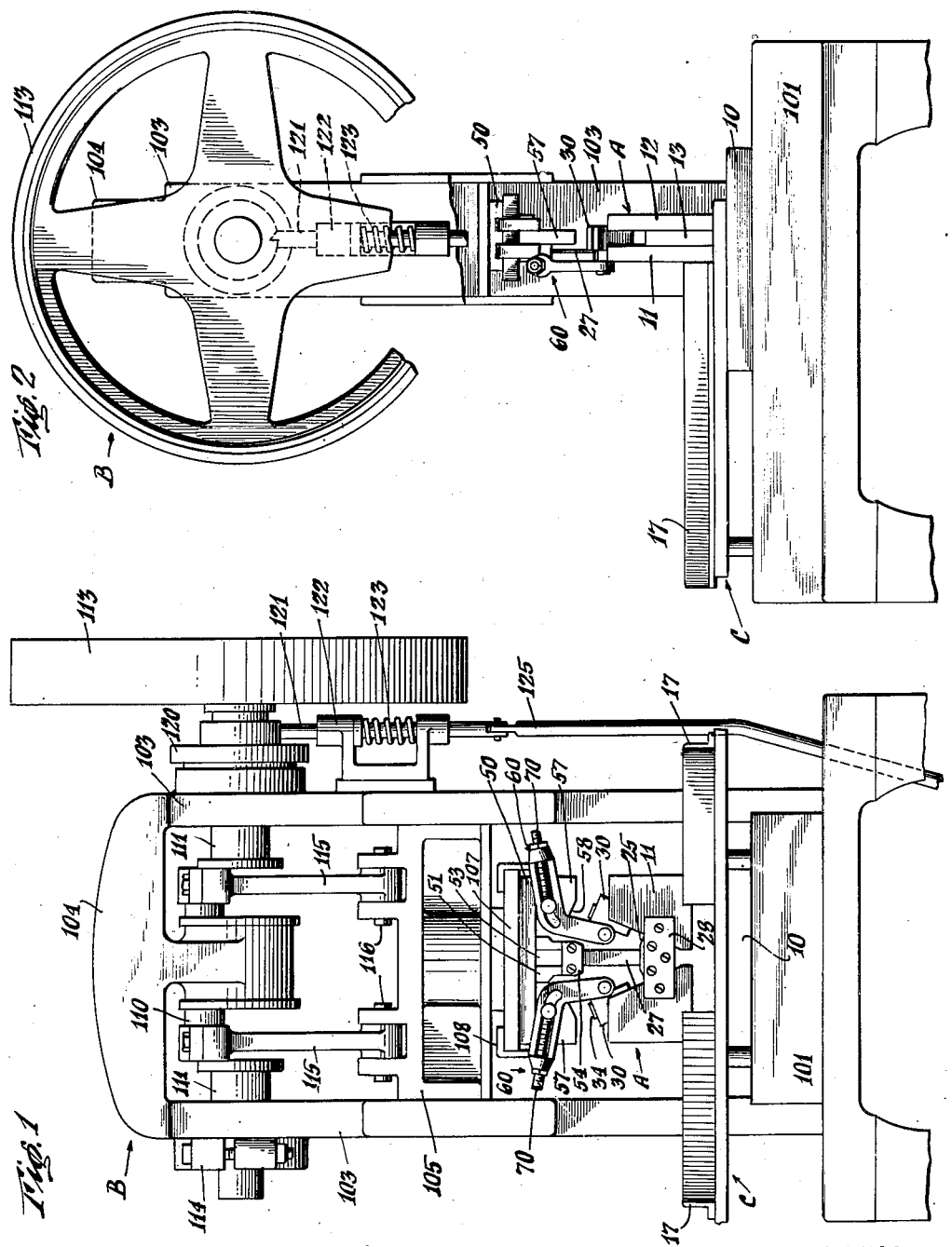
INVENTOR
Glenn H. Norquist
BY
Austin, Wilhelm & Carlson
ATTORNEYS Sept. 20, 1949.  G. H. NORQUIST  2,482,122
NOTCHING MACHINE
Filed June 23, 1945  4 Sheets-Sheet 2
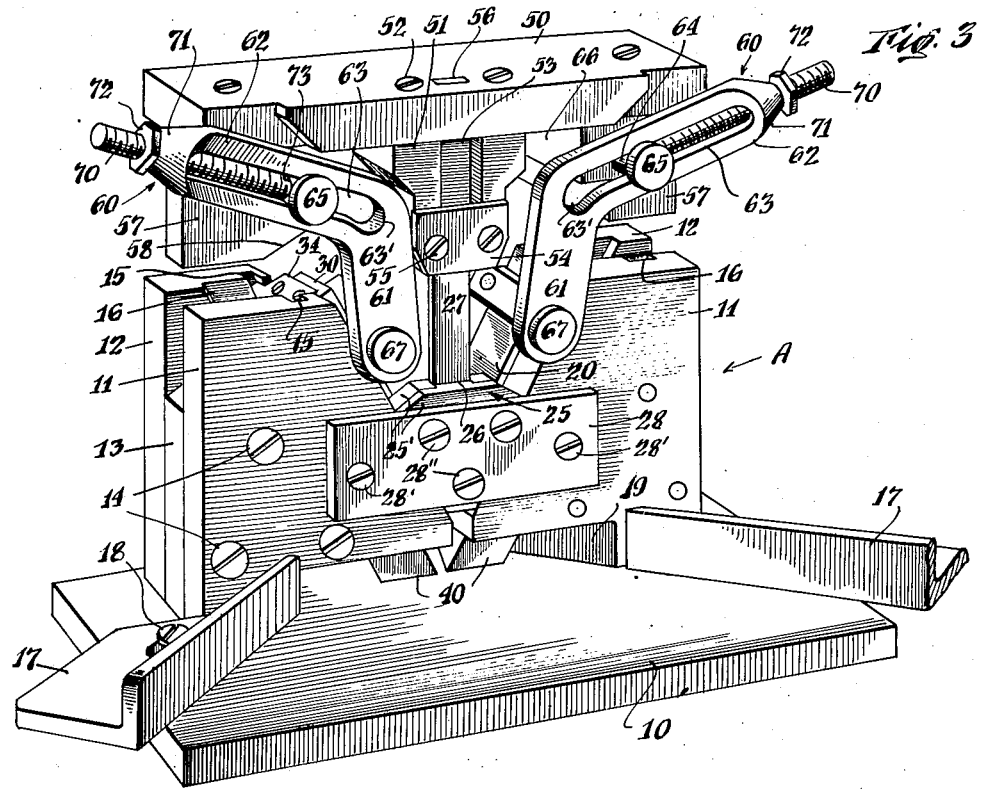
INVENTOR
Glenn H. Norquist
BY
Austin, Wilhelm & Carlson
ATTORNEYS

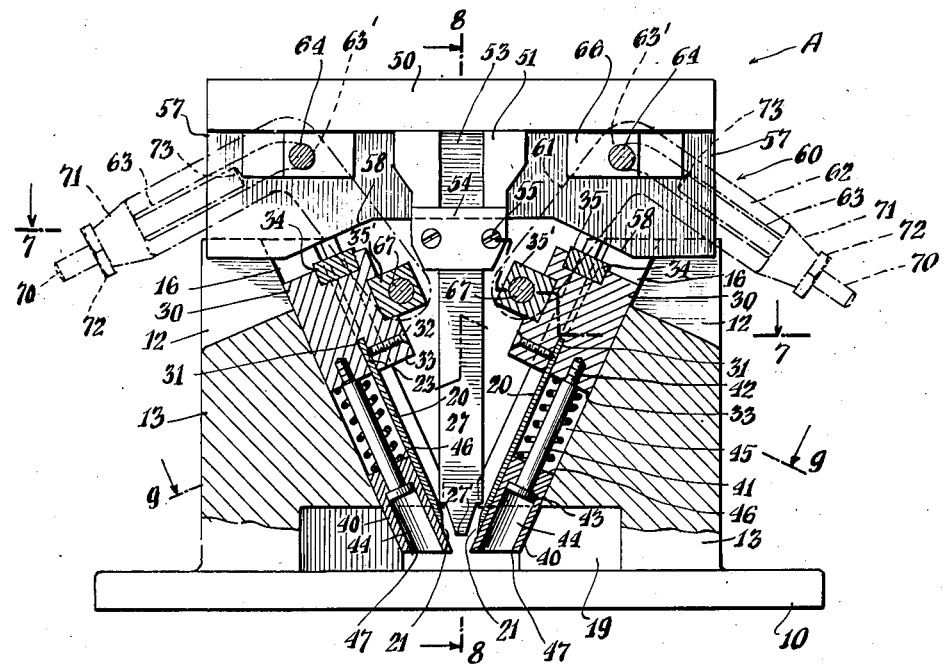

Sept. 20, 1949. G. H. NORQUIST 2,482,122
NOTCHING MACHINE
Filed June 23, 1945 4 Sheets-Sheet 4
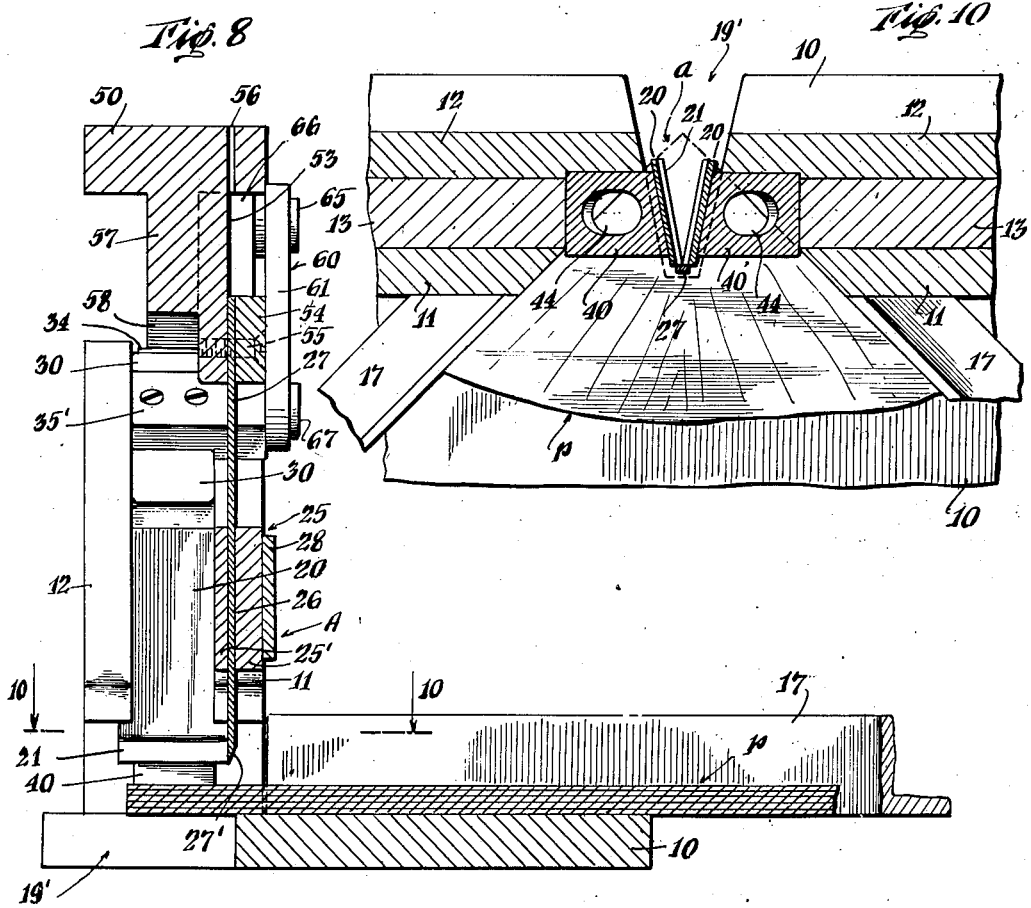
INVENTOR
Glenn H. Norquist
BY
Austin, Wilhelm & Carlson
ATTORNEYS Patented Sept. 20, 1949

2,482,122

UNITED STATES PATENT OFFICE 2,482,122

NOTCHING MACHINE

Glenn H. Norquist, Jamestown, N. Y.

Application June 23, 1945, Serial No. 601,211

17 Claims. (Cl. 164—50)

1

This invention relates to notching machines, and more particularly to an improved machine for cutting and forming irregular shaped holes or notches in wood, plywood fibreboard, composition board and like materials.

The machine forming the subject matter of this invention is particularly adapted for cutting holes or notches in wood, plywood, fibreboard, composition board and like materials which holes and notches have such irregular shape and conformity that the same cannot be made by an ordinary drilling or punching tool. For example, in certain fabrication operations it is necessary to provide preformed notches of accurate shape and form in the corners of plywood and composition board panels so as to permit the formation of flange or side sections, the ends of which will meet to form a neat corner or joint. The formation of such notches require the removal of a V-shaped section of the material of accurate size and shape with the contracted or pointed end of the notch cleanly cut and with the side faces of the notch inclined or beveled at an accurate predetermined angle.

The machine constructed in accordance with this invention is designed to cut and form such irregular shaped notches accurately and with precision, at a high rate of production and with relatively unskilled labor. The machine comprises generally a pair of guide blocks having inclined guideways within which side cutting knives may reciprocate. The cutting ends of these knives are so arranged as to be driven into the material operated upon at the proper angle so as to form clean cut and smooth inclined or beveled surfaces which define the side faces of the notch. An end cutting knife, sliding in a guide member, is provided with a cutting end or point which is driven into the material and smoothly cuts and shapes the contracted or pointed end of the notch. The work piece or panel rests upon the surface of a bedplate provided with guide bars to retain the work piece or panel in the proper operating position during the notching operation. Pressure blocks, adapted to reciprocate in grooves provided in the paired guide blocks, are provided to press the work piece or panel firmly against the bedplate during the cutting operation. Resilient elements, such as coil springs, are provided to press the pressure blocks against the work piece during the notching operation with a predetermined pressure, means being provided to lift the pressure blocks away from the work piece to permit insertion of the work piece to be operated upon under the pressure blocks and to permit removal of the notched work piece from the machine.

The side cutting knives, the end cutting knife, and the pressure blocks are operatively connected to a pressure plate which may be conveniently attached to the reciprocable slide frame of a mechanical press. The end cutting knife may be clamped or otherwise secured in a fixed manner to the pressure plate while the side cutting knives are connected to the pressure plate by an adjustable linkage mechanism which permits the side cutting knives to reciprocate at the desired beveled cutting angle. The pressure plate is provided with a pair of cam elements each having a cam face adapted to ride over and press against a head block attached to the upper end of each of the side cutting knives to drive the cutting ends of the cutting knives into the work piece material. The linkage mechanism is pivotally connected to the knife heads and to the pressure plate in a manner so that the cutting ends of the knives and the pressure faces of the pressure blocks may be raised from the work piece material when the pressure plate is raised a predetermined distance. The linkage mechanism is provided with adjusting means to permit a predetermined amount of play between the pressure plate and the knife heads. The pressure blocks are connected to the knife heads in such a manner as to cause the pressure blocks to move into contact with the work piece an instant before the cutting knives are driven into the material, with the pressure blocks remaining in pressure contact with the work piece during withdrawal of the side cutting knives.

The various operating parts of the notching machine are constructed and formed to operate in synchronism with the reciprocation of the pressure plate. The reciprocation of the pressure plate is under the constant control of the operator through a control device associated with the mechanical press, whose reciprocable pressure frame is connected to the pressure plate. This machine permits the operator to cut and form the required notch in the work piece in a single operation which requires less than a second to perform. When a convenient feed table means is provided to feed and withdraw the successive work pieces to and from the machine, a single operator can cut 500 or more notches per hour.

An object of this invention is to provide an improved machine for cutting irregular shaped holes and notches in work pieces with precision and accuracy and with the minimum of labor and at low cost.

Another object of this invention is to provide an improved automatic cutting machine adapted to operate upon wood, plywood, fibreboard and composition panels and remove V-shape sections from the panel of accurate predetermined form and shape.

A further object of this invention is to provide an improved machine for cutting irregular holes and notches in work piece materials, which is strong and sturdy in construction, simple and fool-proof in operation, and which is adapted to perform a variety of cutting and notching operations accurately and at relatively high production speeds.

Other objects and advantages of this invention will become apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which Fig. 1 is a front elevational view of the improved panel notching machine shown in association with a power driven press for operating the same, and a feed table for supporting the work piece operated upon.

Fig. 2 is a side elevational view of the machine and associated press and feed table, certain parts being broken away to reveal certain operating details.

Fig. 3 is a perspective front face view of the notching machine as it appears when removed from the operating press.

Fig. 4 is a fragmentary perspective view of a corner portion of a panel showing a notch cut in the corner of the panel by the notching machine.

Fig. 5 is a fragmentary perspective view of a corner portion of the panel shown in Fig. 4 after being clad with a metal sheet and grooved so as to permit shaping of the panel flanges, this view showing the manner in which the adjacent ends of the grooves intersect and match with the notched out corner of the panel.

Fig. 6 is an elevational rear face view of the notching machine as the same appears when viewed in the direction of the arrows 6—6 of Fig. 7, certain parts being broken away to illustrate structural details.

Fig. 7 is a top view of the machine shown partly in section to illustrate structural details thereof, this view being taken along line 7—7 of Fig. 6.

Fig. 8 is a vertical cross sectional view of the notching machine as the same appears when viewed along line 8—8 of Fig. 6.

Fig. 9 is a fragmentary cross sectional view of the machine as the same appears when viewed along line 9—9 of Fig. 6; and Fig. 10 is a top plan view of a corner portion of the panel in position for notching out a corner thereof, this view also showing the cutting ends of the side cutting knives and the end cutting knife in position to puncture and cut the panel, as the same appears when looking in the direction of the arrows 10—10 of Fig. 8.

Similar reference characters refer to similar parts throughout the several views of the drawings and specification.

Referring more particularly to Figs. 1 and 2, the automatic notching machine A may be associated with a suitable mechanical press B for applying working pressure to the cutting knives, and an associated feed table C for supporting the panel to be operated upon.

There is illustrated in Fig. 4 a fragmentary corner portion of a panel $p$ which has been operated upon by the machine to remove a V-shaped notch $a$ of the desired size and contour so as to permit subsequent shaping and forming of the panel. It will be noted by referring to Fig. 4 that the side faces $b$ are cut on a bias and that the inner end of the notch $a$ presents a narrow straight face $c$ which is substantially perpendicular to the surface of the panel $p$. The shape or angularity of the V-shaped cut-out $a$ may be formed as desired to permit final shaping of the panel in the desired form by subsequent forming operations.

Fig. 5 illustrates the panel $p$ shown in Fig. 4 after a metal facing sheet $m$ has been bonded and secured to the lower face thereof. The panel $p$ shown in Fig. 5 has also been provided with grooves $g$ of generally V-shaped cross-section which divides the panel into a main section $d$ and flange sections $f$. It will be noted that the grooves $g$ intersect the inner end of the notch cut-out $a$ so as to obliterate the narrow perpendicular facing wall $c$ which defines the inner end of the notch as shown in Fig. 4. In a subsequent operation the exposed corner portion $m'$ of the metal facing sheet $m$ is suitably crimped so as to permit double ply folding thereof. By further operations, the metal clad grooved and notched panel as illustrated in Fig. 5 is placed in a forming press and the flange sections $f$ thereof are bent to a predetermined angle with respect to the center section, which operation substantially closes the grooves $g$. In this forming operation the metal corner portion $m'$ folds inwardly so as to provide a double ply rib with the side faces $b$ of the notch cut-out $a$ clamping the metal rib formation therebetween.

It will be appreciated that the shape and contour of the notch cut-out $a$ is determined by the angle to which the flange sections $f$ of the ultimate metal clad panel is to be bent or shaped with respect to the main section $d$ thereof. For example, if the flange sections $f$ are to ultimately extend at an angle of approximately 45° to the main section $d$ of the metal clad panel, the faces $b$ of the notch $a$ should present therebetween an angle of approximately 45°, and if the flange sections $f$ are to extend at an angle of approximately 90° to the main section $d$ of the metal clad panel, the faces $b$ of the notch cut-out $a$ should present therebetween an angle of approximately 90°. It will also be appreciated that the side faces $b$ of the notch cut-out should be so biased or inclined that these faces extend substantially parallel to one another when the flanges of the metal clad panel have been finally formed, and yet the side faces $b$ when thus paralleled should be spaced apart a sufficient distance to permit the formed inturned metal rib to wedge snugly therebetween.

This invention is more particularly directed to a machine for cutting notches $a$ in plywood, wood, fibreboard, and composition panels in a manner so that the side faces $b$ of the notch are accurately and sharply cut at the desired bias, so that the formed notch is accurate in depth and angularity, so that the end face $c$ of the V notch cut-out is precisely defined and properly shaped, and so that the segment to be removed is completely severed.

The notching machine A for performing this operation is shown fully assembled in Fig. 3 and comprises generally a bed plate 10 which supports two similar spaced front guide blocks 11 and two similar spaced rear guide blocks 12. Each of the front guide blocks 11 is paired with one of the rear guide blocks 12 and are secured to a filler block 13 positioned therebetween by means of tie bolts 14. The lower ends of the filler blocks 13 may be welded or otherwise permanently secured to the bed plate 10. It will be noted that one pair of front and rear guide blocks 11 and 12 are positioned on the left hand side of the center line of the machine, designated as line x—x in Fig. 7, and the other pair of front and rear guide blocks are positioned on the right hand side of the center line x—x.

As shown more particularly in Figs. 6 and 7, similar right and left-hand side cutting knives 20 are provided. Each knife is relatively flat and straight and the side edges thereof are guided to slide in relatively snug inclined grooves 15 formed in the adjacent paired front and rear guide blocks 11 and 12. It will be noted that the downwardly inclined guide grooves 15 in the front and rear guide blocks are so formed and arranged as to retain the knife at an angle to the horizontal axis of the machine indicated by the center line x—x in Fig. 7. As shown in Fig. 6, the lower end of each side knife is provided with a sharp cutting edge 21 shaped and formed to accurately cut and form the side faces b of the notch a. A head block 30 is mounted on the upper end of each side knife 20 so as to reciprocate therewith. The head block 30 is connected to its knife 20 by means of a slot 31 into which the upper end of the knife is snugly seated and there removably held in position by means of a set screw 32 the end of which seats in an appropriate groove 23 provided in the knife blade, as more particularly shown in Fig. 6. Each head block 30 slides in inclined guide grooves 16 formed in the paired front and rear guide blocks 11 and 12, as shown more particularly in Figs. 6 and 7.

A right and a left hand pressure block 40 is provided to seat firmly on the panel operated upon at a point immediately adjacent to the cutting edges 21 of the side knives 20. Each pressure block 40 is arranged to slide in guide grooves 16 formed in each pair of front and rear guide blocks 11 and 12. Each pressure block 40 is operatively connected to the knife head block 30 by a sturdy metal spindle 41, the upper end of which is provided with a threaded portion 42 which is screwed into the lower end of the head block 30 as shown in Fig. 6. The lower end of the spindle 41 is provided with a plunger-head 43 adapted to snugly reciprocate in a plunger-head cavity 44 formed within the pressure block 40. A coil spring 45 surrounds each spindle 41, with the upper end of the spring abutting against the lower face 33 of the head block 30 and with the lower end of the compression spring seating on the upper end 46 of the pressure block 40. It will be appreciated that the coil spring 45 normally resiliently retains the head block 30 and the associated pressure block separated to the maximum extent, with the head end 43 of the spindle 41 seating against the upper end wall of the cavity 44 in the pressure block 40. When downward pressure is exerted on the head block 30, the coil spring 45 exerts downward pressure on the pressure block 40, the head 43 of the spindle 41 being free to telescope downwardly into the guide cavity 44 in the pressure block 40.

It will now be appreciated that both the right and left-hand side cutting knives 20 and their associated head blocks 30 and pressure blocks 40 are adapted to reciprocate in a vertically inclined direction, which reciprocating movement is guided and directed by the respective guide grooves 15 and 16 provided in the paired front and rear guide blocks 11 and 12. The head block grooves 16 as well as the knife grooves 15 should be kept suitably lubricated to insure smooth and efficient operation.

The end face c of the notch a is cut by a vertically extending end knife 27 having a cutting end 27' of the appropriate shape as shown in Figs. 6 and 7. The end cutting knife 27 is guided in its vertical reciprocating movement by means of an end guide block 25 having a guide slot 26 therein through which the end knife 27 reciprocates. The end guide block 25 may be conveniently fabricated from two sections 25' which interfit together to form a guide slot 26 therebetween. The sections 25' may be firmly secured together by means of tie screws 29. The guide block 25 is positioned between the left and right-hand front guide blocks 11 and is secured thereto by means of a retaining plate 28, as shown more particularly in Figs. 3 and 9, the retaining plate 28 being secured as by bolts 28' to the adjacent left and right-hand front guide blocks 11 and to the end guide block 25 by means of suitable screws 28".

The panel p to be notched is placed to lie flat upon the upper face of a bed plate 10 so that the corner of the panel may be notched as shown in Fig. 4. Guide bars 17 are adjustably secured to the base plate 10 as by screws 18 to guide the side edges of the panel p so that the corner thereof will properly be positioned beneath the cutting edges 21 of the side cutting knives 20 and the cutting edge 27' of the end cutting knife 27. The lower center section of the left and right-hand front guide blocks 11 are formed to provide a cavity 19 into which the corner section of the panel may be inserted. The lower center section of the left and right-hand rear guide blocks 12 are also cut away as at 19' to permit insertion of the corner section of the panel to be operated upon.

The side cutting knives 20 and the end cutting knife 27 are reciprocated into and out of cutting position by means of a reciprocally operated pressure plate 50 to which the knives are operatively connected. An attaching lug 51 secured to the pressure plate 50 as by screws 52 projects downwardly therefrom and is provided with a vertical extending groove 53 into which the upper end of the end cutting knife may snugly seat, as shown more particularly in Figs. 3, 6 and 8. Since the end cutting knife 27 is substantially straight, the groove 53 in the supporting lug 51 should be substantially in alignment with the knife guide slot 26 in the end guide block 25. The end cutting knife 27 is clamped or secured to the downward extending lug 51 by means of a clamp plate 54 secured to the lug 51 by means of screws 55. Upon loosening of the securing screws 55, the end cutting knife 27 may be upwardly withdrawn from the machine through an appropriate slot 56 provided in the pressure plate 50. Thus it will be appreciated that when the pressure plate 50 is vertically reciprocated, the end cutting knife 27 attached thereto and extending downwardly therefrom will be reciprocated into and out of cutting position.

Since the side cutting knives 20 must operate on a downwardly inclined angle, means are provided in association with the pressure plate 50 to permit such movement of the side cutting knives. To this end a left and right-hand cam lug 57 is integrally formed with the pressure plate 50 and extends downwardly therefrom. Each of the cam lugs 57 is provided with an inclined cam face 58 designed to engage and slide over the adjacent head block 30 attached to the side cutting knife 20. As shown more particularly in Fig. 6, each of the head blocks 30 is provided with a bearing plate 34 having a cam face 35 over which the cam face 58 of the cam lug 57 may slide in a smooth operating manner. The bearing block 34 may be suitably set into a snug cavity in the upper end of the knife head block 30 and secured in position by suitable means. The bearing block 34 should desirably be formed of suitable bearing metal and the upper cam face 35 thereof kept adequately lubricated.

Mechanism associated with the pressure plate 50 is provided for automatically lifting the side cutting knives 20 and their associated head blocks 30 and pressure blocks 40 when the pressure plate 50 is shifted a predetermined distance. This mechanism comprises a pair of yokes 60 each having arms 61 and 62 extending at an angle slightly greater than 90° with respect to each other. An elongated slot 63 is cut lengthwise in the arm 62 through which a sturdy pin 64 extends. The pin 64 is provided with a suitable head 65 to prevent removal of the yoke 60 therefrom. The pin 64 is attached to a suitable securing lug 66 affixed to and extending downwardly from the pressure plate 50. The lower end of the arm 61 is attached to a headed hinge pin 67 secured to a hinge block 35′ fixed to and forming a part of the knife head block 30. Thus it will be noted that the pressure plate 50 is hingedly connected to the knife head blocks 30 by the yokes 60.

When downward pressure is exerted on the pressure plate 50, the yokes 60 will pivot about the headed hinge pins 67 and each pin 64 attached to the pressure plate 50 will slide in its slot 63 toward the knee portion 63′ of the yoke 60. When the downwardly moving cam faces 58 of the cam lugs 57 having been brought into riding contact with the bearing blocks 34 associated with the knife head blocks 30, further downward movement of the pressure plate 50 drives the cutting ends 21 of the knives 20 into cutting engagement with the panel operated upon.

On the upstroke of the pressure plate 50, the pins 64 carried by the pressure plate 50, will slide in their respective slots 63 towards the outer ends of the yoke arms 62. Stop means are provided to limit the sliding movement of the pins 64 in the slotted arms 62, which stop means may comprise a threaded stop pin 70 extending through the threaded head portion 71 at the end of yoke arm 62. The threaded pin 70 may be provided with a stop nut 72 to retain the threaded stop pin 70 in predetermined position. The end 73 of the threaded stop pin 70 serves to limit the sliding movement of pin 64 in the yoke slot 63. When the pin 64 abuts the stop end 73 of the threaded stop pin 70 the yoke arm 61 will serve as a lifting link to lift the knife head block 30 and its associated blade 20 upwardly to a point where the lower cutting edge 21 of the cutting knife 20 has been raised above the panel operated upon. It will be noted that the yokes 60 permit the pressure plate 50 to be raised a predetermined distance without lifting the side cutting knives 20, and during this interval the end cutting knife 27, which is rigidly fixed to the pressure plate 50, is lifted out of cutting position. Continued upward movement of the pressure plate 50 raises the side cutting knives 20 out of cutting position through the medium of the lifting yokes 60, and finally, during further continued upward movement of the pressure plate 50, the pressure blocks 40 are lifted out of contact with the panel operated upon.

It will be noted that the intermediate filler blocks 13 extend short of the upper ends of the front and rear guide blocks 11 and 12 so as to provide a space therebetween into which the cam lugs 57 associated with the pressure plate 50 may telescope during downward movement of the pressure plate. The inside faces of the front and rear guide blocks 11 and 12 serve to guide the downward movement of the pressure plate 50 during the cutting operation, insuring smooth operation and the elimination of distortive strains on the operating parts.

The pressure plate 50 may be given the desired reciprocating movement by any desired mechanical means, such as the mechanical press B illustrated in Figs. 1 and 2. The mechanical press illustrated comprises a pair of spaced upright standards 103 which rest upon the table frame 101, the standards being connected at their upper ends by a yoke frame 104. A slide frame 105 is arranged to reciprocate between the standards 103. The slide frame 105 has a securing plate 107 affixed thereto to which the pressure plate 50 of the machine may be secured as by clamps 108. The securing plate 107 of the press seats flat against the upper surface of the pressure plate 50 of the notching machine and when these parts are clamped together by clamps 108 the pressure plate 50 and its associated mechanism is positively reciprocated with the reciprocating movement of the slide frame 105.

The slide frame 105 may be reciprocated by any desired mechanism. As shown in Figs. 1 and 2 for purposes of illustration, power means for reciprocating the slide frame 105 may comprise a crankshaft 110 journaled in bearings 111 associated with the supporting standards 103. One end of the crankshaft 110 may be provided with a balancing fly wheel pulley 113 around which a drive belt may be trained, and the other end provided with a friction brake 114. A pair of pitmans 115 are attached through suitable bearings to the crankshaft 110 and to slide frame 105 by means of hinge pins 116.

The panel to be operated upon may be supported upon a table extension C suitably fixed to the table frame 101. The panel guide bars 17 may be of such length as to extend over the supporting frame 101 of the table C to positively insure accurate location of the panel with respect to the notching mechanism.

It is important that the reciprocating movement of the pressure plate 50 be under the immediate control of the operator. A clutch 120 operatively connects the continuously rotating drive wheel 113 to the crankshaft 110. The clutch 120 is engaged by a control bolt 121 supported by a bracket 122 attached to the adjacent supporting frame 103 of the press. The end of the control bolt 121 is normally held in engagement with the clutch 120 by means of a compression spring 123. When the control bolt 121 is in engagement with the clutch 120, the crankshaft 110 does not rotate, and when the control bolt 121 is withdrawn from engagement with the clutch 120 the crankshaft 110 will make one complete revolution and reciprocate the slide frame 105 one complete stroke. The friction brake 114 is adjusted to prevent rotation of the crankshaft 110 when disengaged by the clutch 120 from the drive wheel 113. The lower end of the control bolt 121 is connected to a control rod 125 which is manipulated by the operator by any suitable mechanism such as a foot pedal (not shown).

To notch the panel as in the manner shown in Fig. 4, the operator places the panel $p$ upon the table C and pushes the corner of the panel to be notched into the space 19 and 19' underneath the front and rear guide blocks 11 and 12. The guide bars 17 are so fixed and adjusted as to retain the panel in the proper notching position. At this point the cutting ends 21 of the side cutting knives 20 and the cutting end 27' of the end cutting knife are in full raised position. In this position the pressure blocks 40 are also held in raised position so that the lower ends 47 thereof do not interfere with the insertion of the panel. It will be appreciated that the yokes 60 provide means for suspending the side knife head blocks 30 and pressure blocks 40 from the raised pressure plate 50.

When the panel has been placed in proper operative position beneath the notching knives 20 and 27, the operator manipulates the control rod 125, thereby withdrawing the control bolt 121 from engagement with the clutch 120. The drive wheel 113 will then rotate the crankshaft 110 one complete revolution. It will be noted that the friction brake 114 serves to immediately halt rotation of the crankshaft 110 when it has made one complete revolution.

During the initial 180° rotation of the crankshaft 110 the pitmans 115 attached thereto move the slide frame 105 of the press downwardly, likewise moving the pressure plate downwardly. The cutting end 27' of the end cutting knife 27 contacts the panel and starts cutting the end face $c$ of the notch $a$. When the cam faces 58 of the cam lugs 57 associated with the pressure plate 50 reach the bearing blocks 34 of the knife head blocks 30, the head blocks 30 are driven downwardly in their guide slots 16, thereby driving the cutting ends 21 of the side cutting knives 20 into the panel $p$ so as to cut through the panel and sharply form the beveled side faces $b$ of the notch. With this movement the contact faces 47 of the pressure blocks 40 are pressed firmly against the panel operated upon by the action of the coil springs 45, which are compressed between the upper ends 46 of the pressure blocks 40 and the lower ends 33 of the head blocks 30.

As the crankshaft 110 continues to rotate through its second 180° phase, the slide frame 105 raises the pressure plate 50 and withdraws the cutting end 27' of the end cutting knife 27 from the panel $p$. As the slide frame 105 and pressure plate 50 continue to rise, the cam lugs 57 are lifted out of contact with the knife head blocks 30 permitting the coil springs 45 to expand and raise the head blocks 40, causing lifting withdrawal of the cutting ends 21 of the side cutting knives 20 from the panel. Expansion of the coil springs 45 and the lifting of the head blocks 40 also relieves the pressure exerted against the pressure blocks 40. As the pressure plate 50 continues to rise, the yokes 60 will pivot about pivot pins 61, and the pins 64 will slide in the slots 63 in yoke arms 62 until the pins 64 abut the ends 73 of the threaded stop pins 70. Continued raising movement of the pressure plate 50 will lift the yokes 60, and with them the knife head blocks 30 and associated side cutting knives 20 and pressure blocks 40 so that their lower ends are completely out of contact with the panel which has been notched.

By the use of a notching machine constructed as above described, notches may be cut in panels by a single operator in rapid succession. A reasonably energetic operator can cut 20 or more notches per minute. The machine is substantially foolproof in operation and an operator becomes quickly skilled in the operation of the machine in a few hours. The side cutting knives 20 and end cutting knife 27 may be easily removed from the machine for sharpening when necessary and reinserted without difficulty and in a few minutes time. Irregular shaped notches and openings of almost any shape and contour may be cut on this machine by providing cutting knives of the proper shape mounted in guide blocks in proper angular position. The operating movement of the cutting knives is so synchronized as not to damage or split the panels or interfere with their proper functioning.

While certain novel features of the invention have been disclosed herein, and are pointed out in the annexed claims, it will be understood that various omissions, substitutions and changes may be made by those skilled in the art without departing from the spirit of this invention.

What is claimed is:

1. A machine for notching panels including in combination, a support for the panel, a pair of reciprocable side cutting elements presenting cutting edges for severing the side faces of the notch, a reciprocable end cutting element having a cutting edge shaped to cut the closed end of the notch, means for guiding the reciprocating movement of said cutting elements, and means for reciprocating said cutting elements.

2. A machine for notching panels including in combination, a support for the panel, a pair of reciprocable side cutting elements presenting cutting edges for severing the side faces of the notch, a reciprocable end cutting element having a cutting edge shaped to cut the closed end of the notch, means for guiding the reciprocating movement of said cutting elements, reciprocable means adjacent said cutting elements for pressing the panel against said support, and means for reciprocating said cutting elements and pressing means.

3. A machine for cutting V-shaped notches in panels including in combination, a support for the panel, and a pair of angularly arranged and reciprocably mounted cutting knives presenting cutting edges for severing the side faces of the notch, reciprocably mounted pressure blocks adjacent said cutting knives for pressing the panel against said support, and means for reciprocating said cutting elements and pressure blocks.

4. A machine for cutting a V-shaped notch in a work piece including in combination, a support for the work piece, a pair of side cutting elements presenting angularly arranged cutting edges for severing the side faces of the notch, means for reciprocating said cutting elements, guide means for guiding the reciprocating movement of said cutting elements at an inclined angle whereby the formed notch presents beveled side faces, and means for exerting pressure against the work piece adjacent the notch during the cutting operation.

5. A machine for cutting a V-shaped notch in a work piece including in combination, a support for the work piece, a pair of reciprocable side cutting elements presenting cutting edges for severing the side faces of the notch, guide means for guiding the reciprocating movement of said cutting elements at an inclined angle whereby the formed notch presents beveled side faces, means for exerting pressure against the work piece adjacent the side faces of the notch during the cutting operation, and means for reciprocating said cutting elements and pressure means into and out of operating engagement with the work piece.

6. A machine for cutting a V-shaped notch in the edge of a work piece including in combination, a support for the work piece, adjustable means for retaining the work piece in proper operative position, a pair of reciprocable side cutting elements presenting cutting edges for severing the side faces of the notch, guide means for guiding the reciprocating movement of said cutting elements at an inclined angle whereby the formed notch presents beveled side faces, means for exerting pressure against the work piece adjacent the side faces of the notch during the cutting operation, and means for reciprocating said cutting elements and pressure means into and out of operating engagement with the work piece.

7. A machine for cutting a notch in a work piece including in combination, a support for the work piece, reciprocable cutting knives presenting cutting edges for severing the side faces of the notch, guide blocks having inclined guide grooves for guiding the reciprocating movement of said knives, resiliently mounted pressure blocks adapted to be pressed against the face of the work piece adjacent the notch to be cut therein, and means for reciprocating said cutting knives and pressure blocks into and out of operating engagement with the work piece.

8. A machine for cutting notches in work pieces including in combination, a support for the work piece, a pair of reciprocable and angularly arranged side cutting knives presenting cutting edges for severing the side faces of the notch, guide blocks having inclined grooves for guiding the movement of said knives, head blocks fixed to said knives mounted for sliding movement in said head blocks, pressure blocks mounted for sliding movement in said guide blocks adapted to be pressed against the face of the work piece adjacent the notch to be cut therein, and a reciprocable pressure block adapted to exert cutting pressure against said head blocks.

9. A machine for making a beveled cut in a work piece including in combination, a cutting knife presenting a cutting edge, a support under said cutting edge upon which the work piece is positioned, a guide block having inclined guide grooves for guiding the reciprocable movement of said knife along a path which is inclined with respect to the work piece supporting face of said support, a head block fixed to said knife mounted for sliding movement in said guide block, a pressure block mounted for sliding movement in said guide block adapted to be pressed against the face of the work piece adjacent the path of movement of the cutting edge of said knife, resilient means connecting said pressure block to the head block, and means for reciprocating said head block and its associated cutting knife and pressure block.

10. A machine for cutting V-shaped notches in work pieces including in combination, a support for the work piece, a pair of reciprocably mounted and angularly arranged side cutting knives presenting cutting edges for severing the side faces of the notch, a guide block for each of said knives presenting inclined guide grooves for guiding the reciprocating movement of its associated knife, a head block fixed to each of said knives mounted for sliding movement in the guide block, a pressure block mounted for sliding movement in each of said guide blocks adapted to be pressed against the face of the work piece adjacent the notch to be cut therein, resilient means connecting each pressure block to the adjacent head block, a reciprocable member having cam faces associated therewith adapted to engage said head blocks and drive the cutting edges of the cutting knives into the work piece, and means connecting said member to said head blocks whereby the cutting knives and pressure blocks associated with said head blocks may be manipulated by the movement of said reciprocable member.

11. A machine for making a beveled cut in a work piece including in combination, a support for the work piece, a side cutting knife presenting a cutting edge at one end thereof positioned over the work supporting face of the support, a guide block for said knife having inclined guide grooves for slidably retaining said knife in predetermined downwardly inclined relationship with respect to the supporting face of the work piece, a resiliently mounted pressure block operative to press the work piece material adjacent the cut firmly against said support, a drive member, means for reciprocating said drive member, a cam element associated with said drive member having a cam face substantially normal to the direction of reciprocating movement of said cutting knife for exerting cutting pressure on said cutting knife, and linkage means connecting said drive member to said cutting knife whereby said cutting knife may be lifted out of cutting engagement with the work piece when lifting movement is exerted on said drive member.

12. A machine for cutting a V-shaped notch in a work piece including in combination, a support for the work piece, a pair of reciprocable side cutting knives each presenting a cutting edge at one end thereof for severing the side faces of the notch, a guide block for each of said knives having inclined guide grooves for slidably retaining said knives in a predetermined angular and inclined relationship, a reciprocable end cutting knife having a cutting edge at one end thereof for severing the closed end of the notch, means for guiding the reciprocating movement of said end cutting knife, resiliently mounted pressure blocks operative to press the work piece material adjacent the notch firmly against said support, a reciprocably mounted drive member, means for connecting said end cutting knife to said drive member, and cam elements associated with said drive member having cam faces substantially normal to the direction of reciprocating movement of said side cutting knives for exerting cutting pressure on said side cutting knives in the direction of the path of movement of said side cutting knives.

13. A machine for cutting a V-shaped notch in a work piece including in combination, a support for the work piece, a pair of reciprocable side cutting knives each presenting a cutting edge at one end thereof for severing the side faces of the notch, a guide block for each of said knives having inclined guide grooves for slidably retaining said knives in a predetermined angular and inclined relationship, a reciprocable end cutting knife having a cutting edge at one end thereof for severing the closed end of the notch, means for guiding the reciprocal movement of said end cutting knife, resiliently mounted pressure blocks operative to press the work piece material adjacent the notch firmly against said support, a drive member, means for reciprocating said drive member, means for connecting said end cutting knife to said drive member, cam elements associated with said drive member operating to exert downward cutting pressure on said side cutting knives in the direction of the path of movement of said side cutting knives, and adjustable linkage means connecting said drive member to said side cutting knives whereby said side cutting knives may be lifted out of cutting engagement with the work piece when lifting movement is exerted on said drive member.

14. A machine for cutting V-shaped notches in wood, plywood, fibrous and like work pieces including in combination, pair of relatively flat side cutting knives, guide blocks for reciprocably supporting said knives in generally V-shaped relationship to one another, a bed plate under the cutting ends of said knives for supporting the work piece, pressure blocks reciprocably supported by said guide blocks adjacent said side cutting knives, said pressure blocks having pressure faces adapted to be pressed against the work piece closely adjacent the path of the movement of the cutting ends of said side cutting knives, and means for reciprocating said pressure blocks and side cutting knives in synchronism.

15. A machine for cutting V-shaped notches presenting inclined side faces in wood, plywood, fibrous and the like work pieces including in combination, pair of relatively flat side cutting knives, guide blocks for reciprocably supporting said knives in downwardly inclined and in generally V-shaped relationship to one another, a bed plate under the cutting ends of said knives for supporting the work piece, pressure blocks reciprocably supported by said guide blocks adjacent said side cutting knives, said pressure blocks having flat pressure faces adapted to be pressed against the work piece closely adjacent the path of the movement of the cutting ends of said side cutting knives, and means for reciprocating said pressure blocks and side cutting knives in synchronism.

16. A machine for cutting V-shaped notches presenting inclined side faces in wood, plywood, fibrous and the like work pieces including in combination, pair of relatively flat side cutting knives for cutting the inclined side faces of the notch, guide blocks for reciprocably supporting said side cutting knives in downwardly inclined and in generally V-shaped relationship to one another, an end cutting knife for cutting the closed end of said notch, a bed plate under the cutting ends of said knives for supporting the work piece, pressure blocks reciprocably supported by said guide blocks adjacent said side cutting knives, said pressure blocks having pressure faces adapted to be pressed against the work piece closely adjacent the path of the movement of the cutting ends of said side cutting knives, and means for reciprocating said pressure blocks, end cutting knife and side cutting knives in synchronism.

17. The method of cutting V-shaped notches presenting inclined faces in wood, plywood, fibreboard and like work pieces which includes, placing the work piece on a support, pressing the work piece material adjacent the notch to be cut firmly against the support, and during continuance of said pressure, driving the cutting ends of the side cutting elements in an inclined direction into and through the work piece to define the inclined side faces of the notch, and substantially simultaneously driving the cutting end of the end cutting element into and through the work piece to define the closed end of the notch, then retracting the cutting end of the end cutting element from the work piece, then retracting the cutting ends of the side cutting elements from the work piece, and finally releasing the pressure on the work piece and removing same from the support.

GLENN H. NORQUIST.

REFERENCES CITED

The following references are of record in the file of this patent:

UNITED STATES PATENTS

| Number | Name | Date |
| --- | --- | --- |
| 26,441 | Mason | Dec. 13, 1859 |
| 348,763 | Millet | Sept. 7, 1886 |
| 530,780 | Kingsbury | Dec. 11, 1894 |
| 1,517,625 | Glasser | Dec. 2, 1924 |
| 2,208,966 | Eickman | July 23, 1940 |
| 2,325,230 | Crane | July 27, 1943 |